R. BRITTON.
WRAPPING MACHINE.
APPLICATION FILED DEC. 14, 1903.

956,473.

Patented Apr. 26, 1910.
9 SHEETS—SHEET 4.

Witnesses
L. Douville
P. F. Nagle

Inventor
Robb Britton
By Diedersheim + Fairbanks
Attorneys

R. BRITTON.
WRAPPING MACHINE.
APPLICATION FILED DEC. 14, 1903.

956,473.

Patented Apr. 26, 1910.
9 SHEETS—SHEET 9.

UNITED STATES PATENT OFFICE.

ROBB BRITTON, OF CLIFTON, PENNSYLVANIA, ASSIGNOR OF ONE-HALF TO MAYER M. SWAAB, JR., AND HENRY FLEER, OF PHILADELPHIA, PENNSYLVANIA.

WRAPPING-MACHINE.

956,473.            Specification of Letters Patent.     Patented Apr. 26, 1910.

Application filed December 14, 1903. Serial No. 185,005.

*To all whom it may concern:*

Be it known that I, ROBB BRITTON, a citizen of the United States, residing at Clifton, Delaware county, State of Pennsylvania, have invented certain new and useful Improvements in Wrapping-Machines, of which the following is a specification.

My invention relates to a novel construction of a wrapping machine and consists of means whereby rectangular articles such as caramels, cakes of soap, cakes of yeast, chewing gum and the like are inclosed in an inside and an outside wrapper, as hereinafter fully set forth.

It further consists of novel features of construction, all as will be hereinafter fully set forth.

Fig. 4ª represents a side elevation of certain of the parts seen in Fig. 4.

Similar numerals of reference indicate corresponding parts in the figures.

Referring to the drawings, 1 designates the frame of the machine in which is journaled the main driving shaft 2 which in the present instance is driven by a belt 3 which passes partly around the pulley 4.

Figure 1:
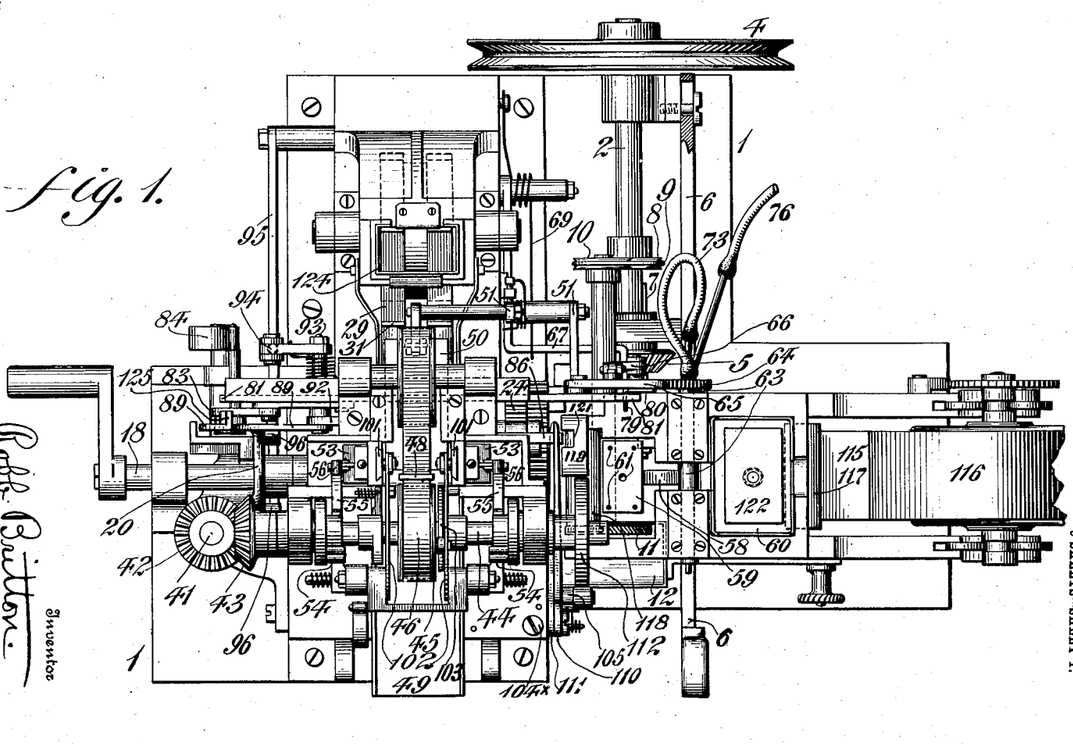
Figure 1 represents a plan view of my improved wrapping machine.
Figures 4, 5:
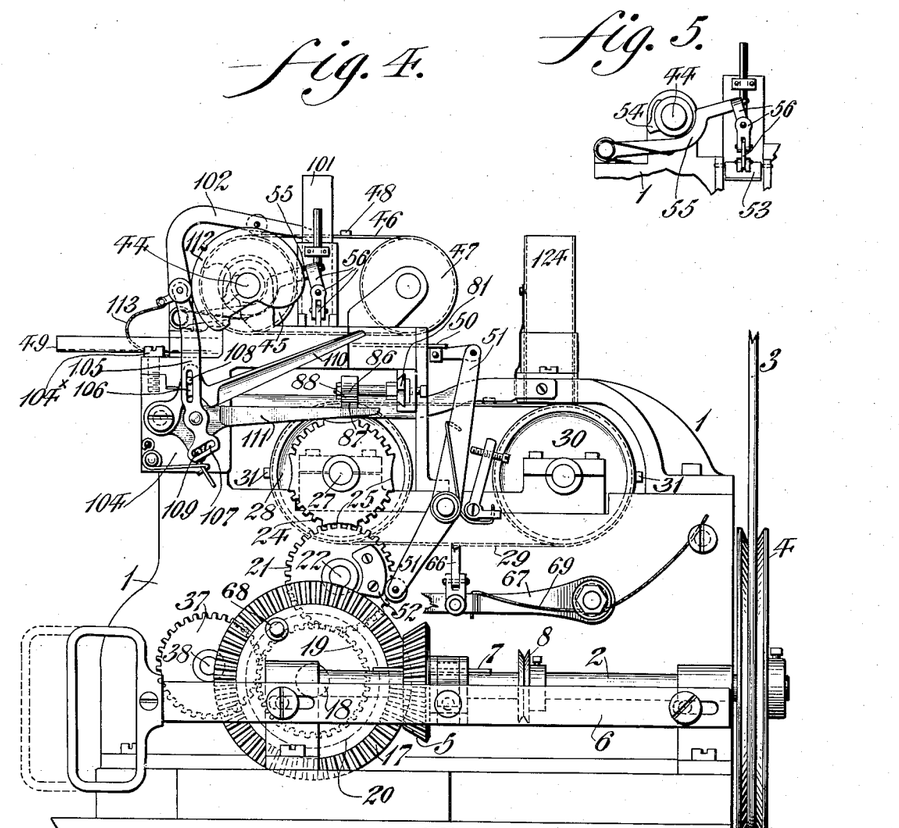
Fig. 4 represents a side elevation of the machine partly broken away.
Fig. 5 represents a side elevation of a portion of the wrapper folding device.
Figure 4A:
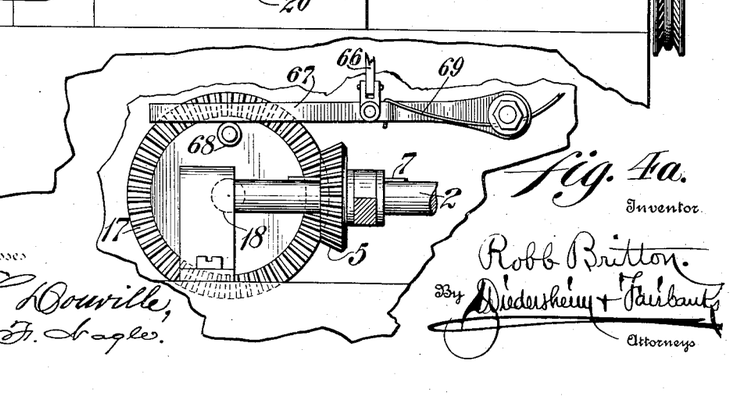
Figures 12, 13, 14, 15, 16, 17, 18, 19:
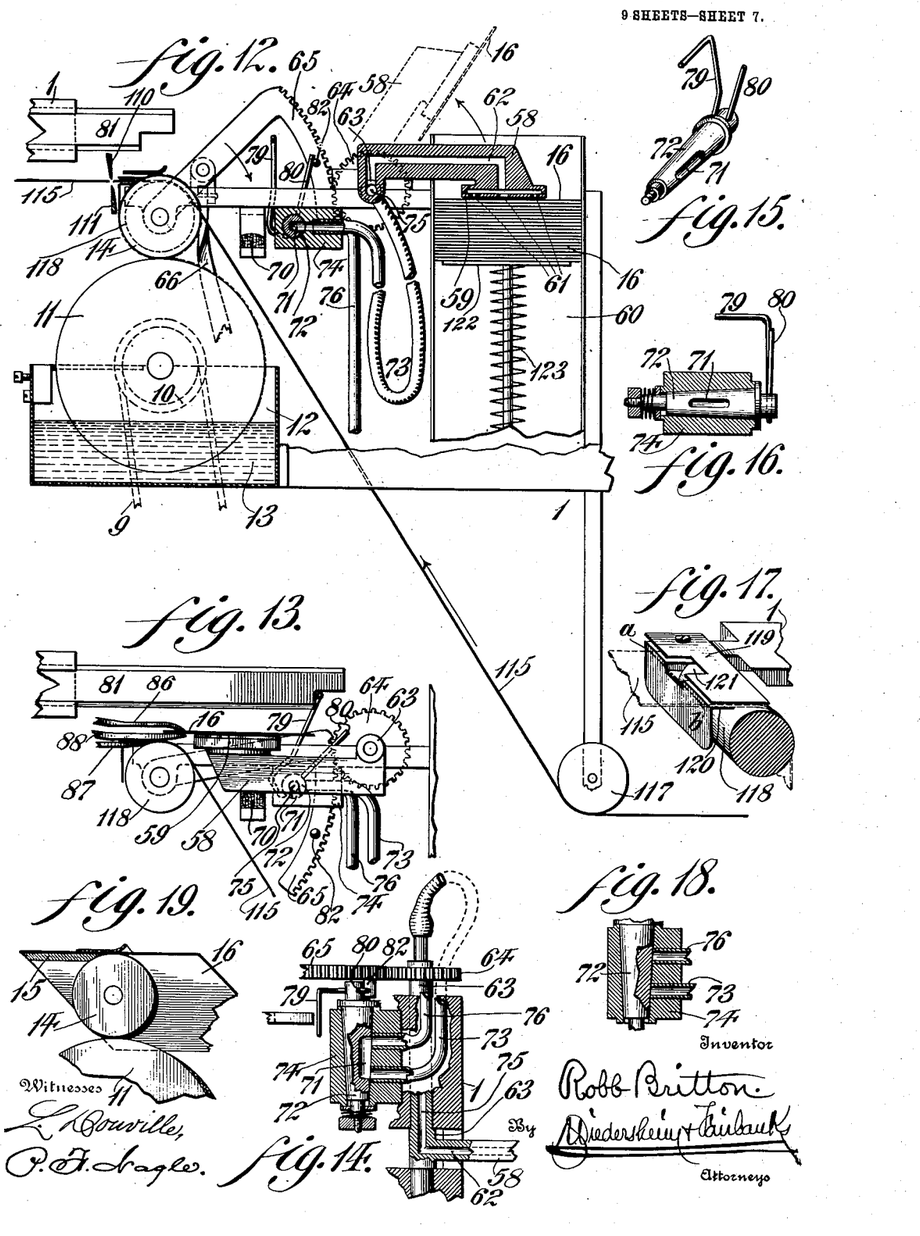
Figs. 12 and 13 show respectively a suction device and a gripper mechanism.
Fig. 14 represents a partial plan view and partial horizontal section of an air valve.
Fig. 15 represents a perspective view of the plug of said valve.
Fig. 16 represents a side elevation of the plug seen in Fig. 15 and means for retaining said plug in its casing.
Fig. 17 represents a perspective view of a portion of the mechanism shown in Fig. 12.
Fig. 18 represents a partial plan view and partial horizontal section of the plug shown in Fig. 14.
Fig. 19 represents a fragmentary perspective view of the gumming device shown in Fig. 12.

The shaft 2 is provided with a bevel gear wheel 5 adapted to be moved longitudinally on said shaft by a sliding bar 6, as best seen in Figs. 1 and 4, it being understood that said gear wheel 5, by reason of the spline 7 is caused to rotate the shaft 2 while at the same time it may be moved longitudinally thereon. The shaft 2 has secured thereon a pulley 8 which by means of a belt 9 (see Figs. 1, 2 and 12) imparts motion to a pulley 10 which rotates the disk 11 so that the latter which is placed partly within a trough 12 may feed the adhesive material 13 therein, see more particularly Fig. 12, to a wheel 14 which applies said adhesive material along the edge 15 of an outside wrapper 16, as seen in Fig. 19.

Figure 3:
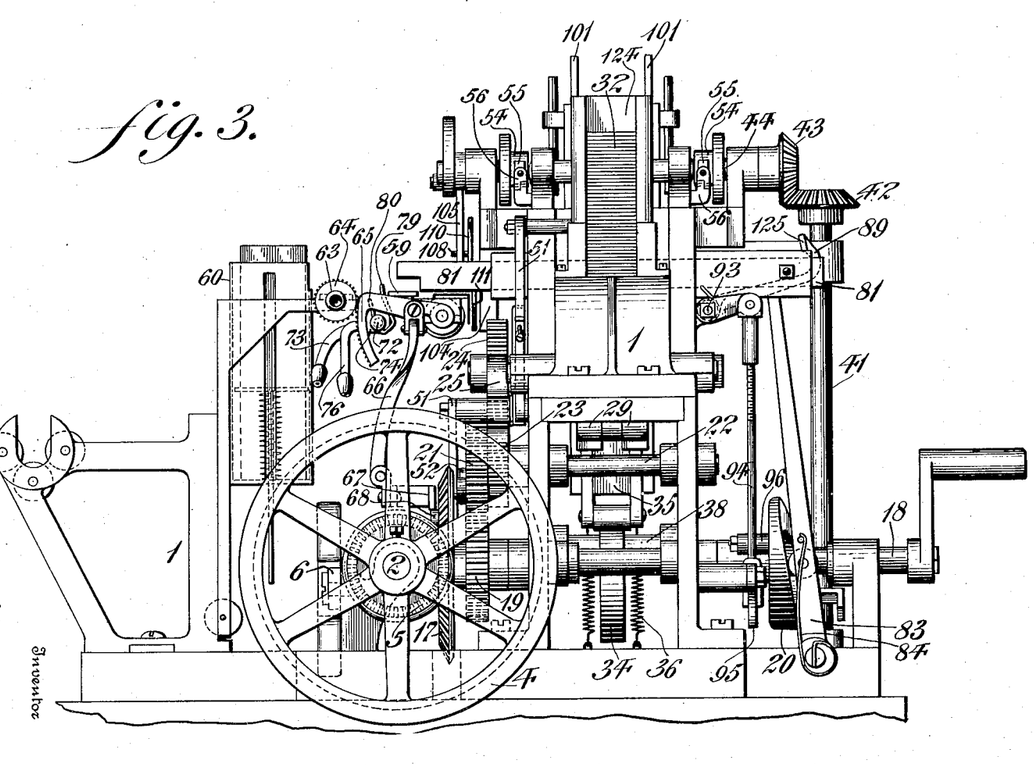

The bevel gear 5 meshes with the bevel gear 17 secured to the shaft 18 so as to impart motion thereto and consequently to the gear wheel 19 and cam 20 thereon, see more particularly Fig. 3.

Figure 7:
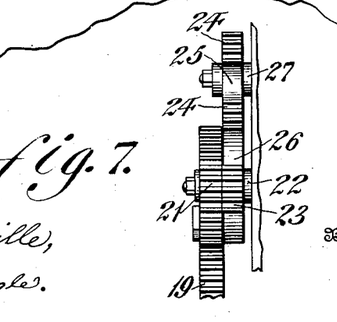
Fig. 7 represents in end elevation certain of the gear wheels shown in Fig. 6.

The gear wheel 19 meshes with a pinion 21, see Figs. 3, 4 and 7, on a shaft 22 which has secured thereto a mutilated gear wheel 23 which meshes with a gear wheel 24 provided with peripheral recesses 25 which, at times, are engaged by the smooth periphery 26 of the gear wheel 23 so as to lock said gear wheel 24 and prevent its rotation during a portion of the revolution of the gear 23. The gear wheel 24 is secured to a shaft 27 which carries a pulley 28 which is provided with suitable recesses in the peripheral faces thereof, see Fig. 8, and partly around which passes an endless band or flexible gear 29 which is formed preferably of tempered steel without moving joints and which also passes partly around the pulley 20 which is likewise provided with suitable recesses in the peripheral faces, said band having the teeth $29^{x}$ projecting from the interior thereof and being adapted to enter and engage with the said recesses in the faces of the pulleys 20 and 30 so that motion will be imparted to said band thereby. Projecting from the outer side of said band 29 are the abutments or projecting pieces 31 the latter being rigidly secured to the band and moving therewith. By reason of the absence of moving joints the teeth $29^{x}$ are always brought into proper engagement with recesses whereby the abutments will always be properly presented to the article 32 to be wrapped, since it will be understood that the said abutments are properly spaced on said band with respect thereto, in order that the said articles will always be presented to the plate 33 which is adapted to receive the same at the proper time. An upward movement is imparted to said plate 33 by a cam 34 and the cross-head 35, the downward movement of said plate 32 being effected by springs 36, see Figs. 8 and 9.

Figure 6:
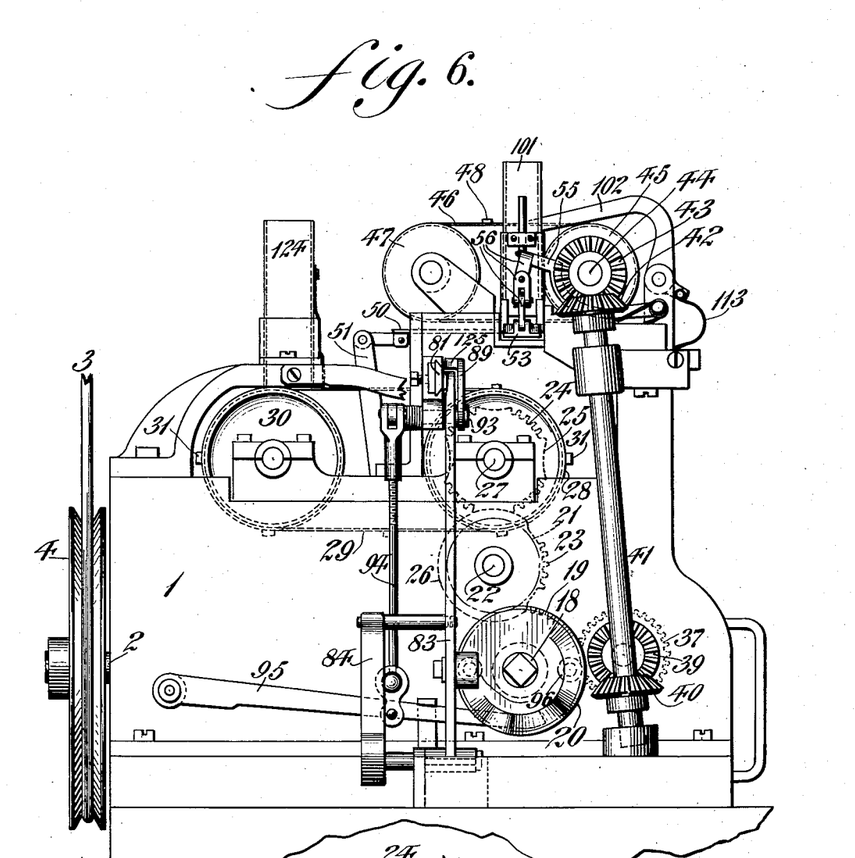
Fig. 6 represents an elevation of the side of the machine opposite that shown in Fig. 4.
Figures 8, 9, 10, 11:
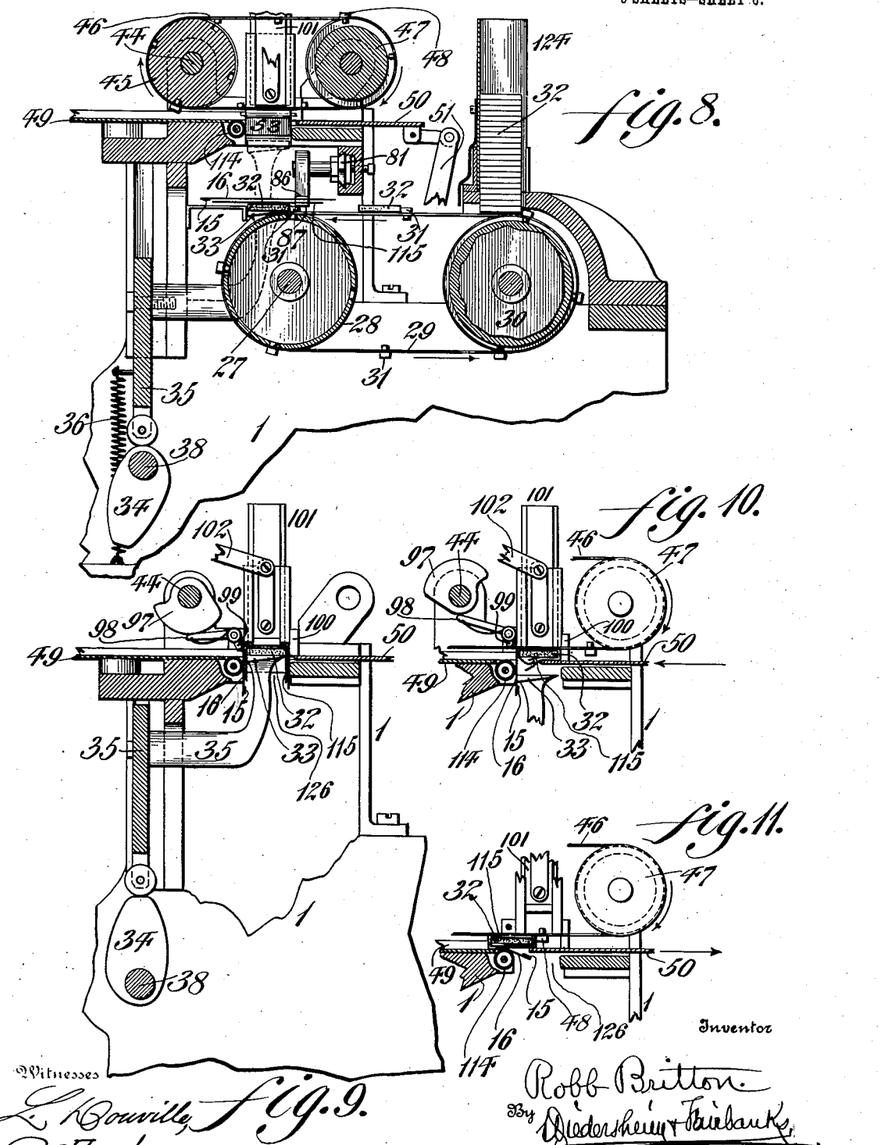
Figs. 8 to 11 both inclusive represent side elevations of the wrapper folding portions of the machine, some of which are partly in vertical section.

In Fig. 8 it will be seen that I have shown the projections $29^{x}$ as being situated exactly on opposite sides of the band from the abutments 31, although this may not be necessary, but for convenience of construction I form the projections $29^{x}$ of the heads of the screws which secure the abutments in position. The gear wheel 19 also meshes with a gear wheel 37 so as to impart motion to the shaft 38, which carries a bevel gear wheel 39 that meshes with a gear wheel 40 on the shaft 41, which latter also carries a bevel gear wheel 42 that meshes with a gear wheel 43 on a shaft 44, it being noted that said shaft 44 has secured thereon the pulley 45 which is provided with suitable recesses in its peripheral face and partly around which passes an endless band or flexible gear 46 similar to the band 29 already described. Said band 46 also passes around a pulley 47 which is likewise provided with the recess in its peripheral face and said band has the teeth $46^{x}$ which project inwardly and are adapted to enter and engage with the recesses in the pulleys 45 and 47, the band being also provided with the projections or abutments 48 which are adapted to engage the articles 32 after the same are wrapped and convey them to a table 49 from which they may be removed and stored away, see Figs. 3, 4 and 6.

Figure 25:
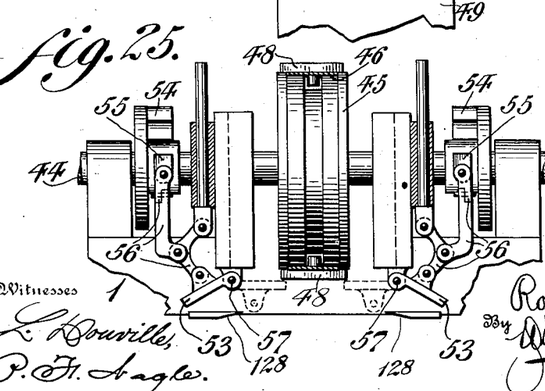
Fig. 25 represents a side elevation of another portion of the wrapper folding device.

Guided in the frame 1 is a plate 50 to which a reciprocating motion is imparted by the levers 51 and cam 52 mounted on the pinion 21, said plate acting as a folder for the wrappers, as hereinafter described, see Figs. 3, 4 and 8. Also pivoted in the frame 1 are folders 53 to which motion is imparted by cams 54 on the shaft 44, see Figs. 1, 5 and 25, it being noted that said cams 54 operate the levers 55 and by reason of the links 56 turn the folders 53 on their pivots 57, as best seen in Fig. 25. Also pivoted in the frame 1 is an arm 58 provided with a plate 59 adapted to be brought in contact with the uppermost wrapper 16 in the box 60, see Fig. 12. The plate 59 is provided with openings 61 whereby the wrapper 16 which is in contact with said plate is caused to adhere thereto by reason of a partial vacuum existing in the bore 62 in the arm 58 and is produced by means hereinafter described.

The arm 58 projects from a spindle 63 journaled in the frame 1, see more particularly Figs. 12 and 14, and is turned on its bearing by means of the pinion 64 and segmental gear 65 which latter is operated by the link 66, lever 67 and roller 68. The downward movement of the lever 67 is effected by a spring 69, see Figs. 4 and $4^{a}$, and the degree of this movement is regulated by a stop 70 seen in Figs. 12 and 13.

The passage 71 in the valve plug 72, see Figs. 2, 12, 14, 15 and 16, communicates at times with a pipe 73 which leads from the valve casing 74 to the bore 75 in the spindle 63, it being noted that said passage 71 also communicates at the same time with a pipe 76 which leads from the valve casing 74 to a receiver $75^{x}$ from which the air is exhausted, in the present instance by the pump 77.

The pipe 76 has connected therewith a valve 78 which serves as a governor and may be adjusted so as to maintain a partial vacuum to a predetermined degree in said pipe 76 and the receiver 75.

The valve plug 72 is provided with projecting stems 79 and 80 for a purpose hereinafter described, see Figs. 14 to 16. Guided in the frame 1 is a bar 81, one end of which is adapted to be brought, at times, in contact with the stem 79 so as to turn the valve plug 72 in one direction and the segment 65 is provided with a stud 82 adapted to be brought, at times, in contact with the stem 80 so as to turn the valve plug 72 in an opposite direction to that in which it is turned by the bar 81. A sliding motion in one direction is imparted to the bar 81 by the cam 20 and lever 83 and in an opposite direction by a spring 84 and said cam 20 is so designed as to cause the bar 81 to remain stationary at certain periods of its movement in one direction.

The sliding bar 81 has journaled thereon a cam 85, see Figs. 20 to 23, both inclusive, which is adapted to open the jaws 86 and 87 which are located, respectively, above and below the stationary jaw 88, it being noted that an arm 91 projects from the shaft of said cam and is adapted to be operated by the levers 89 and 92 which are rigid on a fulcrum 93 common to both levers and are operated by a rod 94 to which motion is imparted by a lever 95 and rollers 96 on the cam 20.

The shaft 44 has secured thereon a cam 97 adapted to operate the lever 98 so as to cause the finger 99 to be brought in contact with an article 32, as illustrated in Fig. 9 and retain said article temporarily in the position seen in said figure by pressing the same against the portion 100 of the frame 1.

Guided in the frame 1 are plates 101 to which a sliding motion is imparted by the lever 102 and cams 103 for a purpose hereinafter described.

Figure 2:
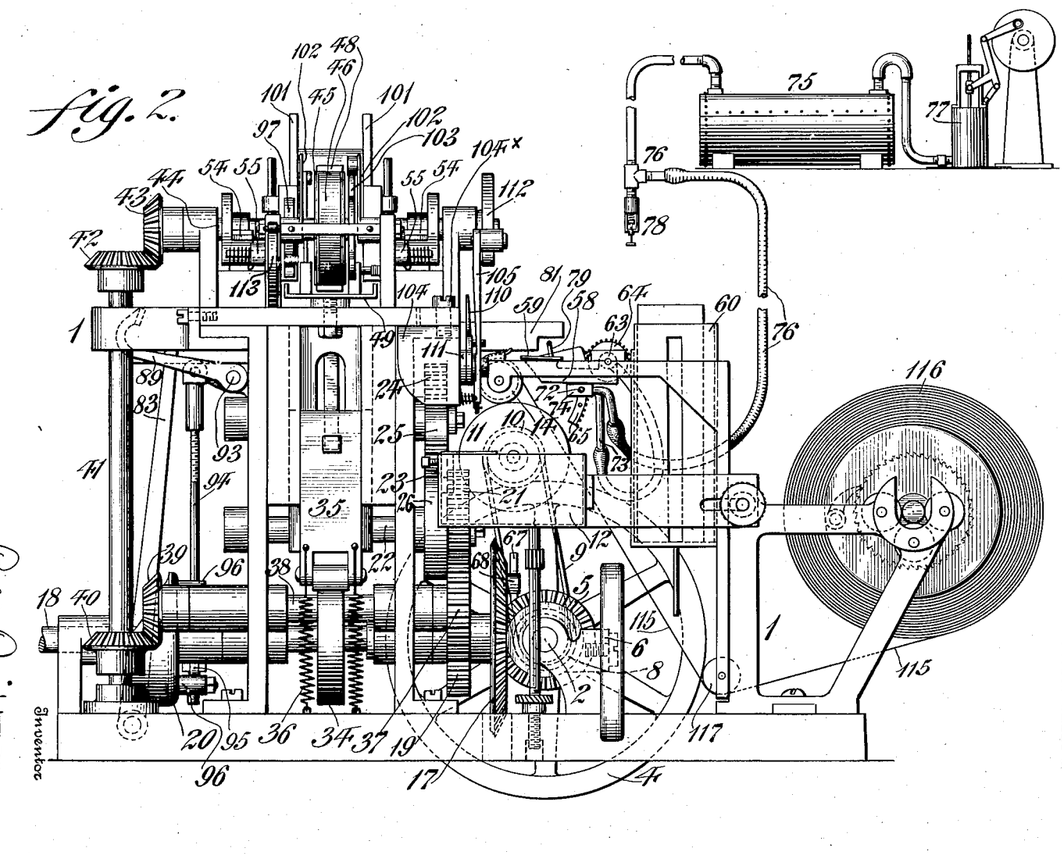
Figs. 2 and 3 represent respectively front and rear elevations of the machine.

Pivoted in a block 104 held by a single screw 104×, see Figs. 2 and 4, in the frame 1 is a lever 105 provided with slots 106 and 107 adapted to receive studs 108 and 109 respectively and which project from the blades 110 and 111 of the shears seen in Fig. 4 so as to open and close them when said lever 105 is oscillated by the cam 112 and spring 113.

Journaled in the frame 1 is a roller 114, see Fig. 11, over which an article 32 is passed so as to produce the final fold in the outside wrapper inclosing said article and seal the same.

The operation is as follows:—The paper or other wrapping material 115 from which the inner wrappers are formed is taken from a roll 116 and is passed under a roller 117 and over a roller 118 and then between the plates 119 and 120, see Figs. 2 and 17, said plates serving as a clamp to retain the free end of said paper 115 in the proper position to be cut by the blades 110 and 111 and furthermore to be grasped by the gripper 87, it being noted that the shears cut said paper 115 along the line a—b in Fig. 17. The plates 119 and 120 are recessed as at 121 to permit the forward end of the grippers 86 and 88 to advance sufficiently beyond the forward edge or line of cut a—b of the paper 115 to take hold thereof. The outer wrapper sheets 16 are then placed in the box 60 and are supported by a follower 122 which is lifted gradually by a spring 123, see Fig. 12, so as to bring the uppermost wrapper 16 in a position to be in contact with the plate 59 when the latter is in the position seen in said Fig. 12. The articles 32, to be wrapped, are then placed in a receptacle 124, see more particularly Fig. 8, after which the rod 6 is shifted so as to cause the bevel gear wheel 5 to mesh with the bevel gear wheel 17 whereupon the machine is put in operation.

The lowermost article 32 rests upon the belt 29 so that when a projecting piece 31 impinges against said article the latter is conveyed by the belt 29 to the plate 33 and when said article is deposited thereon the belt 29 comes to a standstill by reason of a recess 25 in the gear wheel 24 being brought in contact with the smooth or toothless portion 26 of the mutilated gear wheel 23. The gear wheel 24 and consequently the belt 29 remain stationary until the teeth in the gear wheel 23 again mesh with the teeth in said gear wheel 24. During this dwell in the movement of the belt 29, the jaws 86 and 87 are brought from the positions seen in Fig. 20 by the mechanism hereinbefore described, to the positions seen in Figs. 13 and 22 whereupon the paper 115 is grasped by the jaw 87 and an outer wrapper 16 is grasped by the jaw 86, it being noted that when the bar 81 is in the position seen in Fig. 22, the cam 85 has been turned by the arm 91, which is brought in contact with the lever 92 and thus closes said jaws upon the paper 115 and wrapper 116.

Figures 20, 21, 22, 23:
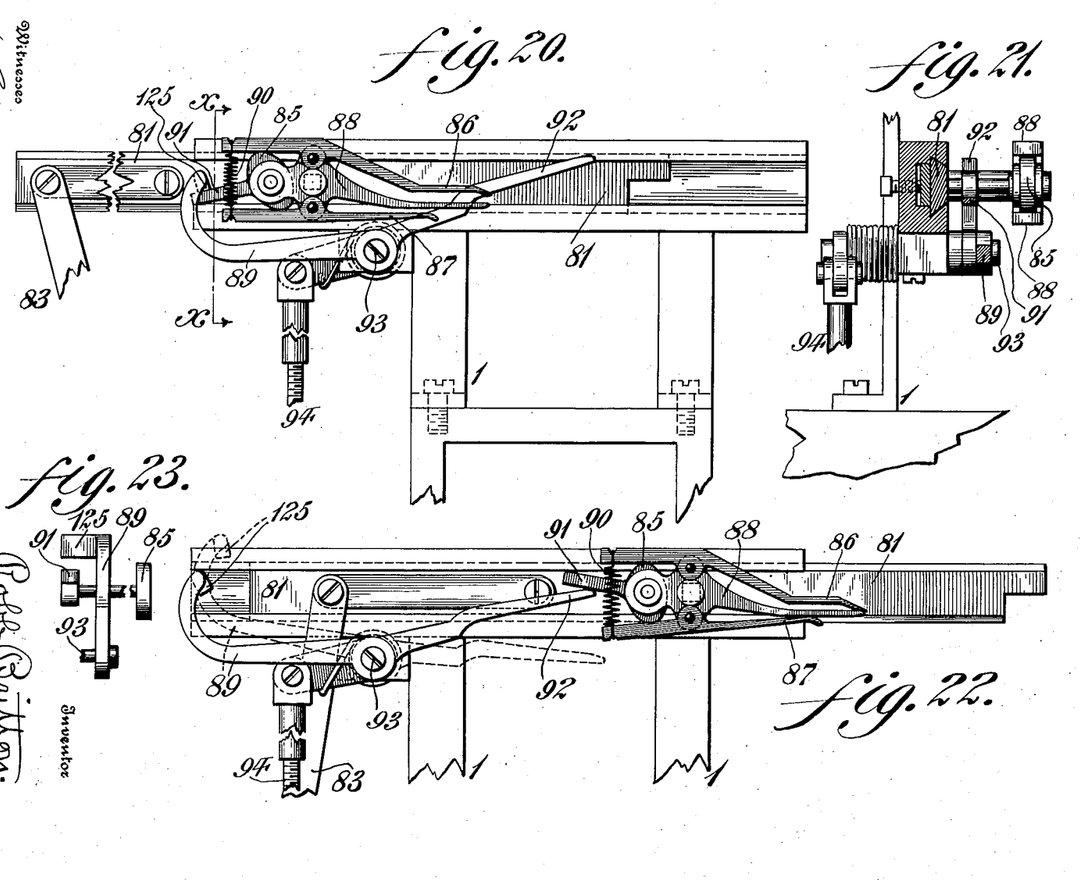
Fig. 20 represents a side elevation of a wrapper gripping device.
Fig. 21 represents a section on line x—x Fig. 20.
Fig. 22 represents a side elevation of the parts seen in Fig. 20 showing the parts in a different position.
Fig. 23 represents an end elevation of certain of the parts seen in Fig. 22.

When the bar 81 is in the positions seen in Figs. 12 and 20 the various parts of the machine seen in said figures are in the positions they then occupy, it being noted that the stud 64 has brought the valve plug 72 into the position that produces a communication between the tank 75× and bore 62 in the arm 58 whereupon the uppermost wrapper 16 is caused to adhere to the plate 59 by reason of the partial vacuum in the bore 62 and when the segment 65 is moved from the position seen in Fig. 12 to that seen in Fig. 13 the stem 79 is struck by the bar 86 and turns the plug 72 into the positions seen in Figs. 13 and 18 whereupon the communication between the tank 75× and bore 62, in the arm 58 is shut off and thus prevents air from entering the tank 75 when the wrapper 16 is withdrawn from the plate 59 by the jaw 86. It is to be understood that when the segment 65 is in the position seen in Fig. 13 said segment has imparted motion to the pinion 64 so as to turn the spindle 63 and thus bring the plate 59 and wrapper 16 thereon into the position required to place said wrapper in the path of the jaw 86.

When the bar 81 is moved from the position seen in Fig. 13 to that seen in Fig. 12 the wrapper sheet 16 and cut paper 115 are drawn by the jaws 86, 87 and 88 into a position directly above the article 32, as seen in Fig. 8. The plates 101 are then lowered by the mechanism hereinbefore described and bear against the cut paper 115 and wrapper 16 to prevent the same from slipping on the article 32. The blades 110 and 111 were previously closed by the mechanism hereinbefore described so as to cut a strip from the paper 115, said strip forming the inner wrapper, see more particularly Fig. 12. When a wrapper sheet 16 is removed from the plate 59 it is caused to pass over the gumming wheel 14, see Fig. 19, so as to have adhesive material applied thereto before the final fold is made.

Figures 24, 26, 27, 28, 29, 31:
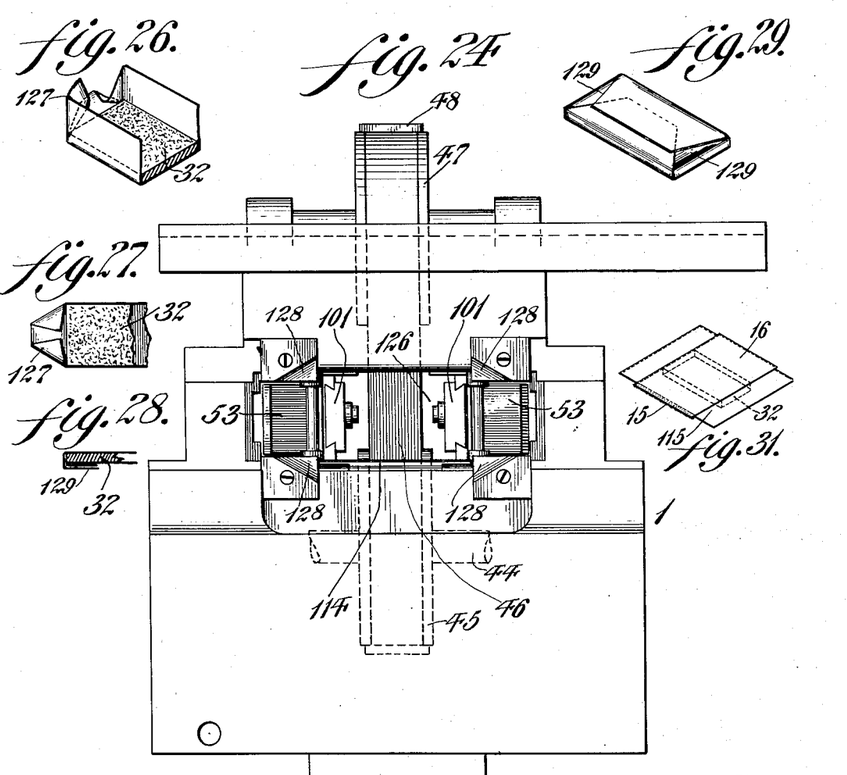
Fig. 24 represents a plan view of the underside of a portion of the wrapper folding box.
Fig. 26 represents an inverted perspective view of a portion of an article to be wrapped partly inclosed in the inner wrapper.
Fig. 27 represents a plan view of the parts seen in Fig. 26.
Fig. 28 represents a vertical section of the parts seen in Fig. 27.
Fig. 29 represents an inverted perspective view of the inside wrapper after the same has passed through the various folding operations.
Fig. 31 represents in perspective the article and the wrappers in position to enter the folding device.
Figure 30:
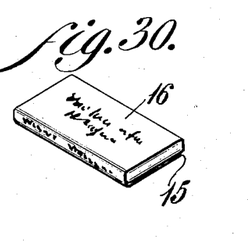
Fig. 30 represents a perspective view of the completed wrapping of an article, as, for instance, a piece of chewing gum.

When the bar 81 is moved from the position seen in Fig. 22 to that seen in Fig. 20, the arm 91 is brought under the member 125 of the lever 89, see more particularly Fig. 23, so that when said lever 89 is brought into the position seen in Fig. 20 from that seen in dotted lines in Fig. 22, the arm 91 and cam 85 are brought into the positions seen in Fig. 20 and thus permit the spring 90 to contract and in doing this open the jaws 86 and 87 thereby releasing their hold on the paper 115 and wrapper 16. When the jaws 87 and 88 have drawn the required length of paper 115 from the reel 116 the bar 81 dwells long enough to permit the blades 110 and 111 to cut a strip for the inner wrapper, after which the bar 81 resumes its movement toward its normal position, as seen in Fig. 20, and thus places both wrappers in the proper positions on top of an article 32. The plate 33 is now raised by the mechanism hereinbefore described and forces an article 32 and the wrappers thereon into the pocket 126, see more particularly Figs. 9, 11 and 24, thereby producing a partial folding of both wrappers, as seen in Fig. 9. The end portions of the inner wrapper are partly turned in as at 127 in Figs. 26 and 27 by the beveled corners 128 of the pocket 126, seen in Fig. 24. The plates 101 are now elevated by the mechanism hereinbefore described, so as to no longer bear against the wrappers while the finger 99 is brought against the article to be wrapped so as to retain the same in the pocket 126, as seen in Fig. 9, when the plate 33 is lowered. When the plate 33 is raised, the projecting piece 31 adjacent thereto is permitted to resume its forward movement. The folders 53 are now operated and produce the folds 129, seen in Figs. 28 and 29, after which the plate 50 is advanced and produces the folds in both wrappers and on the underside of an article 32, as seen in Fig. 10. The finger 99 is now removed from the article 32, as seen in said Fig. 10, after which a projection 48 is brought against said article 32 and causes the latter to pass between the roller 114 and the underside of the belt 46 thereby producing the final folds in both wrappers, as seen in Fig. 11, it being understood that the gummed edge 15 causes the final fold to remain permanently in position, as seen in Fig. 30.

When a projection 48 leaves the articles 32, in passing around the pulley 45, said articles 32 have been brought upon the table 49 from which they may be taken and stored away.

While I have before described the wrapping of a single article, that is the lowermost in the receptacle, it will be evident that I may wrap a plurality of articles in a single wrapper, this being accomplished by changing the size of the various parts of the mechanism.

By carrying the articles to be wrapped in a substantially horizontal direction from the receiver, assembling them with the inner and outer wrappers beneath the folding device, forcing them upward therethrough and carrying the wrapped articles again horizontally to a table or like receiving means, I am able to operate the machine at high speed and with great capacity.

It is evident that various changes may be made by those skilled in the art which may come within the scope of my invention and I do not therefore desire to be limited in every instance to the exact construction herein shown and described.

Having thus described my invention, what I claim as new and desire to secure by Letters Patent, is:—

1. In a wrapping machine, a receptacle for the articles to be wrapped, an endless band movable beneath said receptacle and forming the bottom thereof, a projection on said band adapted to engage with one or more of the articles in said receptacle, folding means, intermittently vertically-movable means for supporting the wrapper and raising the same and the article to the folding means, and means independent of said vertically-movable means for moving said band so as to advance said articles successively from said receptacle to said vertically-movable means.

2. In a wrapping machine, a receptacle for the articles to be wrapped, an endless band movable beneath said receptacle and forming the bottom thereof, a projection on said band adapted to engage with one or more of the articles in said receptacle, folding means, intermittently vertically-movable means for supporting the wrapper and raising the same and the article to the folding means, and means independent of said vertically-movable means for intermittently moving said band so as to advance said articles successively from said receptacle to said vertically-movable means.

3. In a wrapping machine, a receptacle for the articles to be wrapped, an endless band movable beneath said receptacle and forming the bottom thereof, a projection on said band adapted to engage with the lowermost article in said receptacle, folding means, intermittently vertically-movable means for supporting the wrapper and raising the same and the article to the folding means, and suitably mounted mutilated gear wheels for intermittently moving said band to advance said articles successively from said receptacle to said vertically-movable means.

4. In a wrapping machine, a wrapper folding pocket, means for forcing an article to be wrapped and a piece of wrapping material into said pocket, separate means for bringing a piece of wrapping material beneath the folding means, a suitably supported endless band adjacent the exit end of said pocket, means for moving said band, means adjacent said band for receiving the article and the wrapper folded thereon, and means on said band for engaging such article and advancing it to said receiving means.

5. In a wrapping machine, a wrapper folding pocket, means for forcing an article to be wrapped and a piece of wrapping material into said pocket, separate means for bringing a piece of wrapping material beneath the folding means, a suitably supported endless band adjacent the exit end of said pocket, means for moving said band, means adjacent said band for receiving the article and the wrapper folded thereon, and means interposed between said pocket and said receiving means for completing the folding of the wrapper on the article.

6. In a wrapping machine, a wrapper-folding pocket, means for forcing an article to be wrapped and a piece of wrapping material into said pocket, a suitably supported endless band adjacent the exit end of said pocket, a projection on said band, a table adjacent said pocket, a final folding portion between said pocket and said table and means for intermittently moving said band whereby said projection engages with said article and moves it over said final folding portion and on to said table.

7. In a wrapping machine, a wrapper-folding pocket, folding means, means for forcing an article to be wrapped and a piece of wrapping material upward into said pocket and through the folding means, whereby such material is folded laterally over such article, vertically movable means for bearing against the wrapper, means for laterally engaging such article and such material when said raising means is withdrawn and means for further folding such material over such article.

8. In a wrapping machine, a reciprocating gripper jaw and a plurality of oppositely disposed jaws pivoted thereto, each of said pivoted jaws being operative to hold a wrapper against said first named jaw and means for operating said gripper to cause each of said jaws to hold a wrapper against said first-named jaw.

9. In a wrapping machine, a reciprocating gripper jaw and a plurality of oppositely disposed jaws pivoted thereto, each of said pivoted jaws operative to hold a wrapper against said first named jaw and means for operating said gripper to cause each of said jaws to hold a wrapper against said first-named jaw, said wrappers being held in substantially symmetrical relation to each other.

10. In a wrapping machine, a reciprocating bar, a gripper jaw fixed to said bar, jaws pivoted on opposite sides of said bar and means adapted to move said pivoted jaws into operative relation with said fixed jaw.

11. In a wrapping machine, a reciprocating bar, a gripper jaw fixed to said bar, a plurality of jaws pivoted on opposite sides of said bar, a cam adapted to force said pivoted jaws toward said fixed jaw, and a spring adapted to move said pivoted jaws from said fixed jaw.

12. In a wrapping machine, wrapper folding means, vertically reciprocatory means for raising an article to be wrapped and a wrapper upward into said folding means and thereby partially folding the wrapper, vertically movable means for engaging the wrapper during such raising movement, means for laterally engaging the article and wrapper when the lifting means are withdrawn, and reciprocating means movable beneath said article and wrapper while thus held to further fold the wrapper upon the article.

13. In a wrapping machine, wrapper folding means, vertically reciprocatory means for raising an article to be wrapped and a wrapper upward into and through said folding means and thereby partially folding the wrapper, vertically movable means for engaging the wrapper during such raising movement, means for laterally engaging the article and wrapper when the lifting means are withdrawn, and reciprocating means movable beneath said article and wrapper while thus held to further fold the wrapper upon the article.

14. In a wrapping machine, a receptacle for articles to be wrapped, wrapper folding means, vertically reciprocatory means for moving an article from said receptacle to a point beneath said folding means, means for placing a wrapper adjacent and above such article, means for moving such article and wrapper upward into said folding means and thereby partially folding the wrapper, vertically movable means for engaging the wrapper during such raising movement and a cam-actuated pivoted member for laterally holding the article and wrapper in such raised position while the said upward moving means is withdrawn.

15. In a wrapping machine, a receptacle for articles to be wrapped, wrapper folding means, means for moving an article from said receptacle in a substantially horizontal direction to a point beneath said folding means, means for placing a wrapper adjacent and above said article, means for moving such article and such wrapper upward into such folding means and means for moving such wrapped article through said folding means and a cam-actuated pivoted member for holding the article and wrapper in its raised position while the raising means are withdrawn.

16. In a wrapping machine, a receptacle for articles to be wrapped, wrapper folding means, means for moving an article from said receptacle in a substantially horizontal direction to a point beneath said folding means, means for placing a wrapper adjacent and above said article, vertically reciprocatory means for moving such article and such wrapper upward into and through such folding means, a cam actuated pivoted member for holding the article and wrapper in its raised position while said raising means are withdrawn, means for moving such wrapped article from said folding means and means for sealing said wrapper during such last named movement.

17. In a wrapping machine, wrapper folding means, separate means for holding articles to be wrapped, inner and outer wrappers, means for bringing one of such articles and one each of such wrappers successively beneath said folding means, means for forcing them upward into and through said folding means and thereby partially folding the wrapper, and cam-actuated pivoted means laterally engaging the raised article and wrapper while the raising means is being lowered.

18. In a wrapping machine, a receptacle for articles to be wrapped, a receptacle for wrapping sheets, means for cutting off pieces of wrapping material, wrapper folding means, means for bringing one of such wrapping sheets, a piece of such material and one of such articles beneath and adjacent said folding means in the order named and means for raising such article and such wrappers into said folding means and thereby partially folding the wrappers, and cam-actuated pivoted means laterally engaging the raised article and wrappers while the raising means is being lowered.

19. In a wrapping machine, the combination with a receptacle for the articles to be wrapped, folding means, means for raising the article and wrapper to the folding means and supporting the same, of a conveyer for the articles consisting of a flexible band, pulleys around which said band is adapted to pass, said pulleys having recesses at their peripheral faces, teeth projecting inwardly from said band and adapted to enter and engage with the recesses in said pulleys, rigid abutments on the exterior of said band which are adapted to engage with the article to be wrapped, and means for moving said band to advance the articles successively from said receptacle to said raising means.

20. In a wrapping machine, a receptacle for the articles to be wrapped, folding means, means for raising the article and wrapper to said folding means and supporting the same, an endless band movable beneath said receptacle and forming the abutment therefor, abutments on said band adapted to engage with one or more of the articles in said receptacle, pulleys around which said band is adapted to pass, said pulleys having recesses in their peripheral faces, teeth projecting inwardly from said band and adapted to enter and engage with said recesses, and means for imparting motion to one of said pulleys in order to actuate said band.

ROBB BRITTON.

Witnesses:
 JOHN A. WIEDERSHEIM,
 C. D. McVAY.